United States Patent [19]

Janeke

[11] Patent Number: 4,817,892

[45] Date of Patent: Apr. 4, 1989

[54] AEROSPACE PLANE AND ENGINE THEREFOR

[76] Inventor: Charl E. Janeke, 261 Loveday Street, Muckleneuk, Pretoria, Transvaal Province, South Africa

[21] Appl. No.: 43,442

[22] Filed: Apr. 28, 1987

[30] Foreign Application Priority Data

Apr. 28, 1986 [ZA] South Africa .................. 86/3166

[51] Int. Cl.$^4$ .................. B64D 27/20; B64C 1/16
[52] U.S. Cl. .................. 244/15; 244/53 R; 244/74; 60/242; 60/246; 60/270.1
[58] Field of Search .................. 244/74, 73 B, 53 R, 244/15, 53 B; 60/242, 245, 246, 235, 251, 270.1; 239/265.19, 265.17, 265.41; 137/15.1, 15.2

[56] References Cited

U.S. PATENT DOCUMENTS

| | | | |
|---|---|---|---|
| 2,589,548 | 3/1952 | Imbert | 60/242 |
| 2,597,253 | 5/1952 | Milchior | 239/265.17 |
| 2,704,645 | 3/1955 | Colvin | 244/74 |
| 3,242,671 | 3/1966 | Moorehead | 137/15.1 |
| 3,261,571 | 7/1966 | Pinnes | 244/74 |
| 3,285,175 | 11/1966 | Keenan | 60/246 |
| 3,314,437 | 4/1967 | Pike | 244/53 B |
| 4,381,642 | 5/1983 | Giles, Jr. | 60/245 |

FOREIGN PATENT DOCUMENTS

| | | | |
|---|---|---|---|
| 1109645 | 1/1956 | France | 60/245 |
| 943839 | 12/1963 | United Kingdom | 60/246 |

OTHER PUBLICATIONS

4/86 Business Day.
4/86 European News.
4/86 Aviation Week and Space Technology.
8/86 Aviation Week and Space Technology.
8/87 Newsweek.
1/87 Technology Review.

Primary Examiner—Galen Barefoot
Attorney, Agent, or Firm—Michael N. Meller

[57] ABSTRACT

An engine suitable for use in an aerospace plane is a composite engine comprising, in combination, a turbo jet engine, a ram jet engine, and a rocket engine, all arranged co-axially. An aerospace plane comprises such an engine mounted in a body defining, toward a rear thereof, in association with said engine, a nozzle surface which extends rearwardly in curved, concave manner, and which is part-round in cross-section, said or each nozzle surface being arranged in relation to a nozzle of said engine to be an extension of the nozzle.

10 Claims, 2 Drawing Sheets

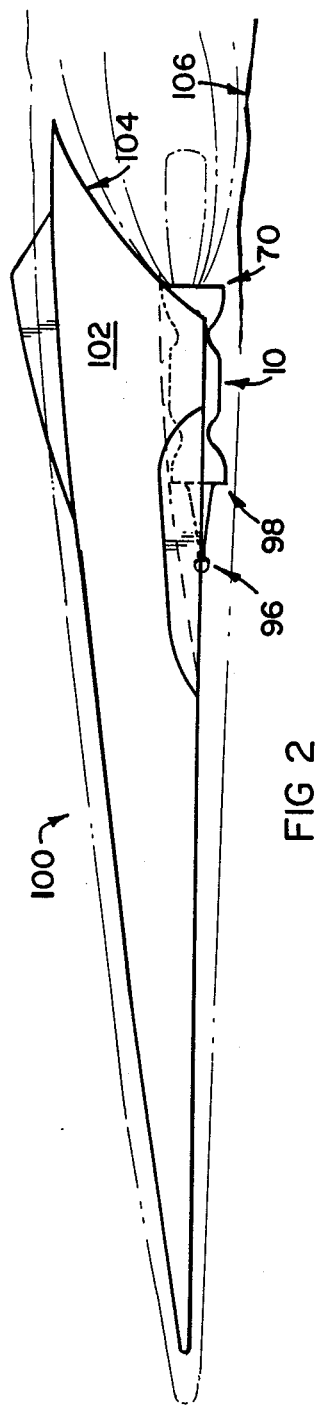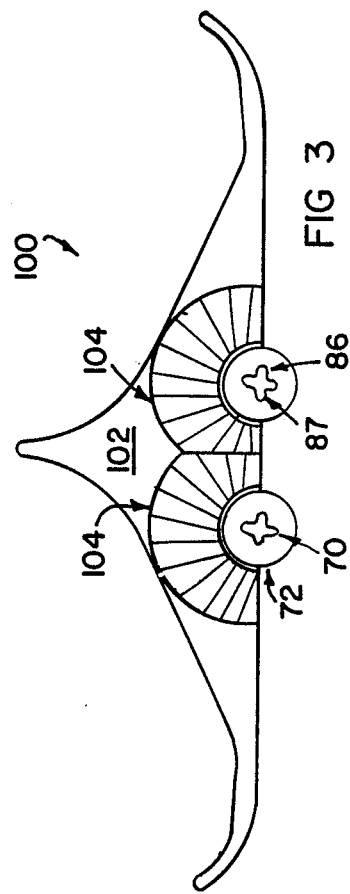

AEROSPACE PLANE AND ENGINE THEREFOR

This invention relates to an aerospace plane and to an engine suitable for use in an aerospace plane.

An aerospace plane in envisaged which will be capable of taking off from ground level and of flying at very high altitudes, e.g. in the upper layers of the atmosphere and even in space, at hypersonic speeds, i.e. speeds well in excess of sonic speeds, say faster than Mach 2, of the order of Mach 5 or faster.

It is envisaged that such a plane will be a commercial plane. It must thus be cost effective in general. Its engine must, inter alia, be capable of operating efficiently from a commercial point of view.

No single known aircraft engine is capable of performing satisfactorily under the above conditions, e.g. a turbojet engine is not efficient at hypersonic speeds, or in the upper layers of the atmosphere, and it cannot operate at all in space.

It is an object of this invention to provide an engine suitable for use in an aerospace plane under conditions as mentioned above.

In accordance with a first aspect of the invention, there is provided an engine suitable for use in an aerospace plane, the engine being a composite engine comprising, in combination, a turbo jet engine, a ram jet engine, and a rocket engine, all arranged co-axially.

The rocket engine may be arranged on the common axis, the ram jet engine being arranged annularly around the rocket engine, and the turbo jet engine being arranged annularly around the ram jet engine.

The ram jet engine may have a diffuser enclosing a diffuser zone, the turbo jet engine having a diffuser which leads out of said diffuser zone. The diffuser of the ram jet engine may be a supersonic converging/diverging diffuser, the diffuser of the turbo jet engine leading out of its throat. The diffuser of the ram jet engine may be annular, its having an outer boundary which is converging, and an inner boundary which is defined by an axial member which is diverging/converging. A lip of the diffuser of the ram jet engine may be adjustable to change its configuration in use in accordance with prevailing conditions, i.e. its operating speed.

The engine may include an adjustable shock wave ram housed in said axial member.

The rocket engine may have a nozzle which is composite and which comprises a primary nozzle exclusive to the rocket engine, and a secondary expansion nozzle providing also an expansion nozzle for the ram jet engine. The primary nozzle may be adjustable in respect of its axial position relative to the secondary expansion nozzle.

In accordance with a second aspect of the invention, there is provided an aerospace plane comprising at least one engine mounted in a body thereof, said engine being a composite engine comprising, in combination, a turbo jet engine, a ram jet engine, and a rocket engine, all arranged co-axially; said body defining, toward a rear thereof, in association with said engine, a nozzle surface which extends rearwardly in curved, concave manner, and which is part-round in cross-section, said or each nozzle surface being arranged in relation to a nozzle of said engine to be an extension of the nozzle.

The nozzle surface is believed to be suitable for use in support of combustion during operation at hypersonic speed when propelled by the ram jet engine.

Generally, the engine may have any suitable combination of features reflected as optional features above.

The invention is now described by way of example with reference to the accompanying schematic drawings. In the drawings FIG. 1 shows, in axial section, a composite engine in accordance with the invention;

FIG. 2 shows, in side view, an aerospace plane having the engine of FIG. 1; and

FIG. 3 shows, in rear view, the aerospace plane of FIG. 2.

Figure 1:
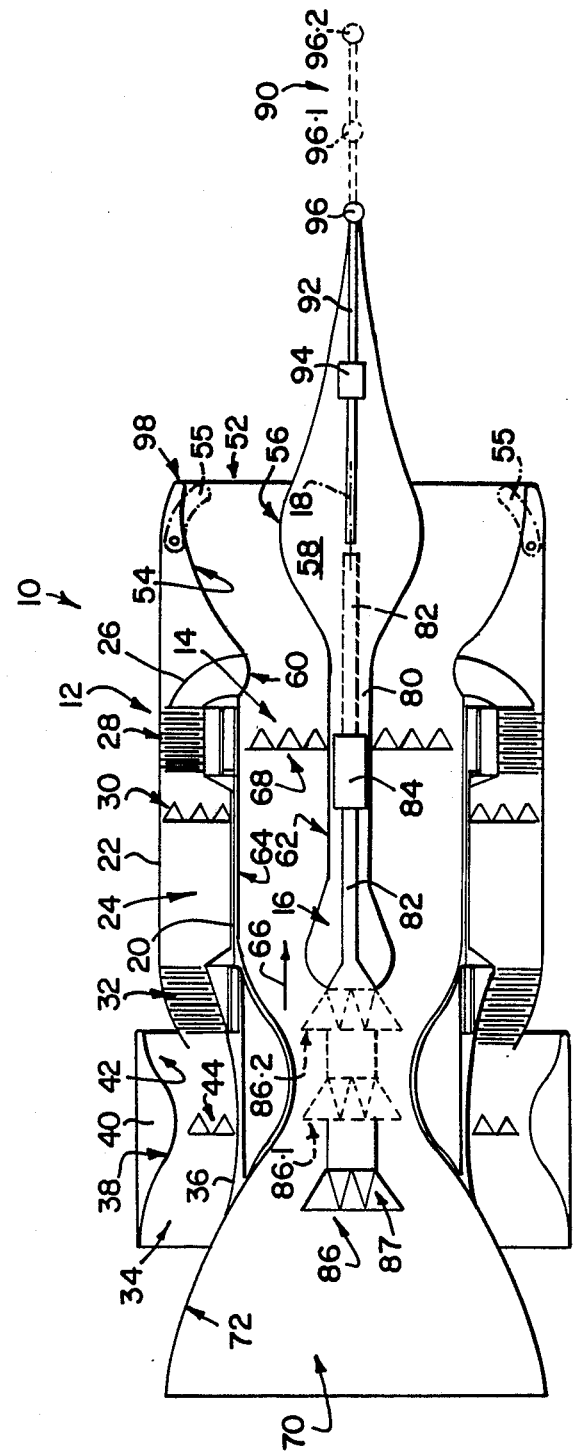

With reference to FIG. 1, it is to be appreciated that the drawing is schematic to illustrate the principle features of the engine. Thus, for example, although it is a section, no hatching is shown.

A composite engine in accordance with the invention is generally indicated by reference numeral 10 in FIG. 1. The composite engine 10 comprises a turbo jet engine generally indicated at 12, a ram jet engine generally indicated at 14 and a rocket engine generally indicated at 16. The turbo jet, ram jet and rocket engines are co-axially arranged about a common axis indicated at 18. The rocket engine 16 is arranged on the axis 18, the ram jet engine 14 is arranged annularly around the rocket engine and the turbo jet engine 12 is arranged annularly around the ram jet engine.

The turbo jet engine 12 comprises a rotatable drum 20 defining an inner boundary, a stationary cylinder 22 defining an outer boundary, a combustion chamber 24 being defined annularly between the drum 20 and the stationary cylinder 22. An inlet 26 leads from a position toward a fore end of the turbo jet engine outwardly and rearwardly toward the combustion chamber 24. It leads to a compressor 28 having rotor blades mounted on the rotatable drum 20 and stator blades mounted on the stationary cylinder 22. It is submitted that the inlet 26 may be configured as a centrifugal extension of the compressor 28. Immediately rearward of the compressor 28, there are provided a plurality of annular flame holders 30. At the rear of the combustion chamber 24, there is provided a turbine 32 having rotor blades fixed to the rotatable drum 20 and stator blades fixed to the stationary cylinder 22. An annular exhaust nozzle 34 is defined between an inner boundary 36 and an outer boundary 38 provided by an augmentation shroud 40 defining an annular inlet 42 between a fore end thereof and the stationary cylinder 22. Flame-holders 44 of an after-burner are arranged in the exhaust nozzle.

The ram jet engine 14 comprises a supersonic converging-diverging diffuser generally indicated at 52. The diffuser 52 is defined annularly between a converging outer boundary 54 and a diverging-converging inner boundary 56 at the outer periphery of an axial member 58 which is substantially conical at its fore end and of part bulbous shape at its rear. A lip generally indicated at 55 is adjustable as shown in chain-dot outline, to change its configuration in use in accordance with prevailing circumstances. The inlet 26 of the turbo jet engine 12 leads outwardly out of a throat of the diffuser 52. Downstream of the diffuser 52, there are provided annularly arranged flame-holders 68. The ram jet engine 14 further comprises a combustion chamber 66 defined annularly between an outer periphery 62 of an axial stem 80 extending rearwardly from the axial member 58, and a stationary cylinder 64 concentric with and immediately inwardly of the rotatable drum 20. The ram jet engine 14 further comprises a supersonic exhaust nozzle 70 defined by a shroud 72.

The rocket engine 16 comprises a primary nozzle 86 mounted at the rear of a shaft 82 adjustably received within the stem 80. The shaft 82 is adjustable by means of adjusting means 84. In some modes of operation of the rocket engine 16, the exhaust nozzle 70 of the ram jet engine co-operates with the primary nozzle 86 to form a composite nozzle for the rocket engine. The primary nozzle 86 is shown in solid lines in its rearmost position indicated at 86. It is shown in dotted in an intermediate position at 86.1 and in dotted at a passive or forward position at 86.2. The primary nozzle 86 may be fluted as shown at 87 so as to promote induction/combustion propagation when adjusted to its most rearward position in support of the hypersonic flight mode or in the low speed rocket boost mode.

The composite engine 10 further comprises a shock wave ram 90 at its leading end. The ram 90 comprises a shaft 92 adjustably housed within the axial member 58. Adjusting means 94 is provided to adjust its position. The ram 90 has a leading formation 96 shown in solid lines in its subsonic or passive position, in dotted lines at 96.1 in an intermediate position and in dotted lines at 96.2 in a forward position.

Operation of the composite engine 10 is now described.

When an aerospace plane powered by the composite engine 10 is stationary and ready for take-off, the ram jet engine 14 cannot operate at all. For take-off and up to relatively low speeds i.e. subsonic speed and supersonic speed up to roughly Mach 2, the turbo jet engine 12 is the main propulsion unit. If desired, especially during take-off, the rocket engine 16 can be used to boost propulsion. It is to be appreciated that a rocket engine is normally inefficient at low speeds. One of the reasons for this is that, ideally, the velocity of exhaust gases at the exit of the exhaust nozzle should be roughly twice the speed of motion. For low speeds, the velocity of the gases will be much higher than the ideal value. In accordance with the invention, if the rocket engine 16 is used at low speeds, the primary nozzle 86 is adjusted to its most rearward position as indicated in solid lines at 86 in the drawing. In that position, gases expelled from the nozzle 86 induce air via the ram jet diffuser 52 and combustion chamber 64 into the flowstream of exhaust gases. This increases the mass of gas expelled and proportionally slows down the velocity. This is made possible by the axial position of the nozzle 86 relative to the nozzle 72 of the ram jet. It is enhanced by having the nozzle 86 of fluted shape as shown at 87 and as briefly described above. It is believed that such induction of air into the flowstream of exhaust gases of the rocket engine will increase its propulsion efficiency. It is envisaged that, if the rocket engine is used at all at low speeds, it will be used merely as a booster in a relatively narrow speed range during and immediately after take-off.

When the aerospace plane attains higher speeds, the ram jet engine 14 is brought into operation. The nozzle 86 of the rocket engine will then be in its passive position at 86.2. When the plane flies at supersonic speeds, the shockwave ram 90 is continually adjusted such that a shockwave forms from its leading formation 96 to the leading edge 98 of the diffuser 52. Thus, a shockwave forms across the mouth of the diffuser 52 which is conducive to good efficiency in the operation of the ram jet engine.

At still higher speeds, the turbo jet engine 12 is taken out of operation and only the ram jet engine 14 propels the plane. This aspect is amplified hereinafter with reference also to FIGS. 2 and 3.

When speeds and altitudes are attained where the ram jet engine 14 starts losing its efficiency, the rocket engine 16 is brought into operation. Eventually, the ram jet engine 14 is taken out of operation and the plane is propelled by the rocket engine only. Then, the nozzle 86 will be in an intermediate position roughly as indicated at 86.1 such that it co-operates with the exhaust nozzle 70 in an optimal manner.

It is an advantage of the present invention that a composite engine is provided capable of efficient operation over a wide speed and altitude range by making use, selectively, in combination or singly, of three types of engines having ranges of good efficiency distributed to cover the wide range of the plane. It is believed that the annular configuration of the engines in accordance with the invention is advantageous.

With reference to FIGS. 2 and 3, an aerospace plane in accordance with the invention is generally indicated by reference numeral 100. Twin engines 10 are shown mounted in a lower part of its body 102. Part-circular, concave after-body portions 104 partially surround and extend shrouds 70 of the engines 10.

When the aerospace plane 10 is propelled in use by the ram jet engines, and when the hypersonic speed range (viz Mach 5 and higher) is being approached, the heat of compression becomes excessive due to the intrinsic requirement to slow the inrushing air to subsonic speed so as to support normal, sub-sonic, combustion in the combustion chambers 66. In respect of each ram jet engine, the diffuser lip 55 and diffuser ram may be adjusted so as to inhibit diffusion (viz compression) of the inrushing air and thus simply to allow the airstream to rush through the combustion chamber 66 and out of the exhaust nozzle at supersonic speed. The flame holder 68 will not be able to support combustion under those conditions due to the relatively slow flame front of the normal range of hydrocarbon fuels when burning in air. It is provided that the rocket engine nozzle 86 will be adjusted during operation in the hypersonic speed range to the extreme position as indicated on FIG. 1 so as to act as a flame-holder or quasi flame-holders in the much larger expansion shroud 72 of the supersonic nozzle 70.

If desired, the rocket engine 16 may be operated simultaneously, conveniently at a low power setting, to act as a combustion catalyst for the larger fuel air flux associated with the ram jet operation. It is thus provided that combustion of the ram jet fuel air mixture in the hypersonic mode and the resulting propulsion reaction may take place partly in the expansion nozzle 70 and partly in an extended nozzle aperture as manifested by a shockwave indicated at 106 and the aerospace plane after-body 104 illustrated in FIGS. 2 and 3. When the rocket 16 is a cryogenically fueled rocket (viz burning hydrogen and oxygen), venting hydrogen alone out of the rocket nozzle 86 may suffice as an adequate catalyst-flame-holder in the hypersonic mode, as hydrogen burns at a supersonic rate in atmospheric air.

When operation of the ram jet engine 14 has eventually to be tapered off because of loss of efficiency, even if it is totally cryogenically fueled, and the rocket engine 16 is brought into operation, the nozzle 86 is adjusted back to its intermediate position, roughly as indicated at 86.1, so as to co-operate optimally with the exhaust nozzle 70.

I claim:

1. An engine suitable for use in an aerospace plane adapted for repeated operation, the engine being a composite engine comprising, in combination and in co-axial arrangement:
   a rocket engine arranged on an axis;
   a ram jet engine arranged annularly around the rocket engine; and
   a turbo jet engine arranged annularly around the ram jet engine, the composite engine comprising:
   a diffuser which is adjustable to render it suitable for subsonic, supersonic and hypersonic operation, which diffuser leads into a combustion chamber for the ram jet engine;
   an inlet leading from the diffuser at a predetermined position thereof into the turbo jet engine, which predetermined position is at a throat of the diffuser when it is adjusted to operate as a supersonic diffuser;
   a secondary expansion nozzle for the ram jet engine which is a converging/diverging expansion nozzle suitable for supersonic operation;
   a primary expansion nozzle for the rocket engine which is longitudinally adjustable to desired longitudinal positions within the secondary expansion nozzle, including the following positions:
   a passive, retracted position upstream of a throat of the secondary expansion nozzle for use when the rocket engine is inoperative and no cooperation between the primary and secondary expansion nozzle occurs,
   an extended position downstream of the throat for use when the rocket engine is operative and the aerospace plane flies at low speed, in which extended position the primary expansion nozzle is adapted to induce ambient air to flow via the diffuser and the ram jet engine into the secondary expansion nozzle, and
   an intermediate position for use when the rocket engine is operative and the ram jet engine is inoperative, in which intermediate position the primary nozzle is aligned with the secondary nozzle such that the secondary nozzle acts as an extension of the primary nozzle, to form a composite expansion nozzle for the rocket engine.

2. The engine as defined in claim 1 wherein the diffuser includes adjustable lips.

3. The engine as defined in claim 1 wherein the primary expansion nozzle for the rocket is fluted to facilitate the induction of ambient air and combustion propagation when adjusted to its extended position downstream of the throat of the secondary expansion nozzle.

4. A method of operating a winged aerospace plane including at least one composite engine comprising, in combination and in co-axial arrangement:
   a rocket engine arranged on an axis;
   a ram jet engine arranged annularly around the rocket engine; and
   a turbo jet engine arranged annularly around the ram jet engine, the composite engine comprising:
   a diffuser which is adjustable to render it suitable for subsonic, supersonic and hypersonic operation, which diffuser leads into a combustion chamber for the ram jet engine;
   an inlet leading from the diffuser at a predetermined position thereof into the turbo jet engine, which predetermined position is at a throat of the diffuser when it is adjusted to operate as a supersonic diffuser;
   a secondary expansion nozzle for the ram jet engine which is a converging/diverging expansion nozzle suitable for supersonic operation;
   a primary expansion nozzle for the rocket engine which is longitudinally adjustable to desired longitudinal positions within the secondary expansion nozzle, including the following positions:
   a passive, retracted position upstream of a throat of the secondary expansion nozzle for use when the rocket engine is inoperative and no cooperation between the primary and secondary expansion nozzles take place,
   an extended position downstream of the throat for use when the rocket engine is operative and the aerospace plane flies at low speed, in which extended position the primary expansion nozzle is adapted to induce ambient air to flow via the diffuser and the ram jet engine into the secondary expansion nozzle, and
   an intermediate position for use when the rocket engine is operative and the ram jet engine is inoperative, in which intermediate position the primary nozzle is aligned with the secondary nozzle such that the secondary nozzle acts as an extension of the primary nozzle, to form a composite expansion nozzle for the rocket engine, the method comprising the steps of:
   during take off, adjusting the primary expansion nozzle to its extended position, operating the turbo jet engine, operating the rocket engine and allowing operation of the rocket engine to induce ambient air to flow via the diffuser and the ram jet engine past the primary nozzle into the secondary nozzle and to exchange momentum with products of combustion of the rocket engine to cause the mass of gas exhausted via the secondary expansion nozzle to be increased and its speed to be decreased;
   after take-off, rendering the rocket engine inoperative and adjusting the primary expansion nozzle to its passive, retracted position;
   during hypersonic flight, rendering the turbo jet engine inoperative, adjusting the diffuser to cause supersonic flow of ambient air into the ram jet engine, and adjusting the primary expansion nozzle to its extended position to act as a flame holder to sustain combustion in the secondary expansion nozzle; and
   during hypersonic flight at very high altitude, rendering the ram jet engine inoperative, adjusting the primary nozzle to its intermediate position to align with and to form a composite expansion nozzle together with the secondary expansion nozzle, and operating the rocket engine.

5. The method as defined in claim 4, further comprising the step of, during hypersonic flight, venting hydrogen from the rocket engine to promote combustion in the secondary expansion nozzle of the fuel/air flux associated with operation of the ram jet engine.

6. The method as defined in claim 5, wherein the location of the composite engine on the winged aerospace plane is in accordance with a predetermined configuration, and the winged aerospace plane has a concave curved afterbody portion aligned with the secondary expansion nozzle and having a heat resistant surface, the predetermined configuration being such that, during hypersonic flight, a shock wave cooperates with the concave curved afterbody portion to form, in association with the secondary expansion nozzle, an enlarged expansion volume, the method further comprising the step, during hypersonic flight, of sustaining combustion in said enlarged expansion volume.

7. The method as defined in claim 6, further comprising the step of operating the engine on a hydro carbon fuel.

8. The method as defined in claim 4, further comprising the step of, during hypersonic flight, operating the rocket engine at a low power setting to act as a combustion catalyst for combustion in the secondarry expansion nozzle of the fuel/air flux associated with operation of the ram jet engine.

9. The method as defined in claim 8, wherein location of the composite engine on the winged aerospace plane is in accordance with a predetermined configuration, and the winged aerospace plane has a concave curved afterbody portion aligned with the secondary expansion nozzle and having a heat resistant surface, the predetermined configuration being such that, during hypersonic flight, a shock wave cooperates with the concave curved afterbody portion to form, in association with the secondary expansion nozzle, an enlarged expansion volume, the method further comprising the step, during hypersonic flight, of sustaining combustion in said enlarged expansion volume.

10. The method as defined in claim 9, further comprising the step of operating the engine on a hydro carbon fuel.

* * * * *